United States Patent [19]

Johnson

[11] Patent Number: 4,530,634
[45] Date of Patent: Jul. 23, 1985

[54] BOAT TRAILER WITH PIVOTAL DROPPED CROSS BAR ROLLER MOUNTING SYSTEM

[76] Inventor: Lawrence N. Johnson, W. 130 Highdrive, Spokane, Wash. 99203

[21] Appl. No.: 65,118

[22] Filed: Aug. 9, 1979

[51] Int. Cl.³ ............................................. B60P 3/10
[52] U.S. Cl. ............................... 414/534; 280/414.1; 403/119; 403/232.1
[58] Field of Search ............... 414/529, 532, 533, 534; 280/145, 414 R, 656, 789, 795–798; 403/65, 119, 189, 232.1, 246

[56] References Cited

U.S. PATENT DOCUMENTS

| | | | |
|---|---|---|---|
| 414,169 | 10/1889 | Reuschel | 403/232.1 |
| 3,160,297 | 12/1964 | Stumvoll | 280/414 R X |
| 3,408,975 | 3/1967 | Desfilles | 280/414 R X |
| 3,756,439 | 9/1973 | Johnson | 280/414 R X |
| 3,785,677 | 1/1974 | Calkins | 280/414 R |
| 3,888,367 | 6/1975 | Cox | 280/414 R X |
| 3,892,320 | 7/1975 | Moore | 280/414 R X |
| 3,917,087 | 11/1975 | Godbersen | 414/534 |
| 3,974,924 | 8/1976 | Ullman | 280/414 R |

Primary Examiner—Robert G. Sheridan
Attorney, Agent, or Firm—August E. Roehrig, Jr.

[57] ABSTRACT

A boat trailer having at least one pivotally mounted crossbar member facilitating loading and unloading a trailer and assuring efficient support of a boat loaded thereon. The crossbar member of the invention is provided with a dropped or curved configuration which supports the hull of a boat at a lowermost position for stability and for effective loading and unloading. The pivotal mounting and curved form of the crossbar member not only maintains the keel or hull as low as possible but naturally permits the hull contacting elements to tilt inwardly without the need for any particular tilting capability. The crossbar member is supported on the trailer booms by an improved bracket having the capability of effectively supporting the crossbar member for pivotal movement.

16 Claims, 10 Drawing Figures

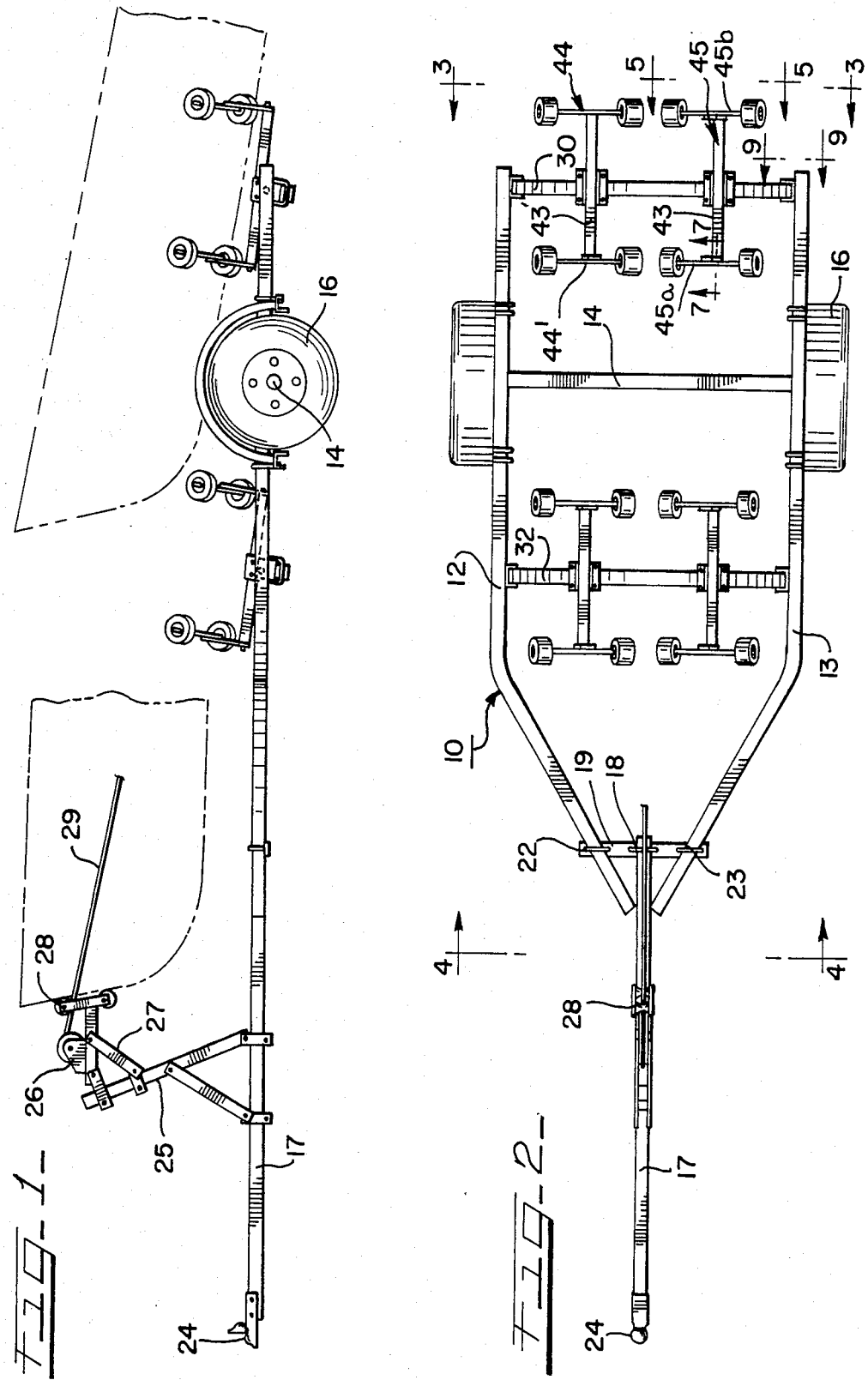

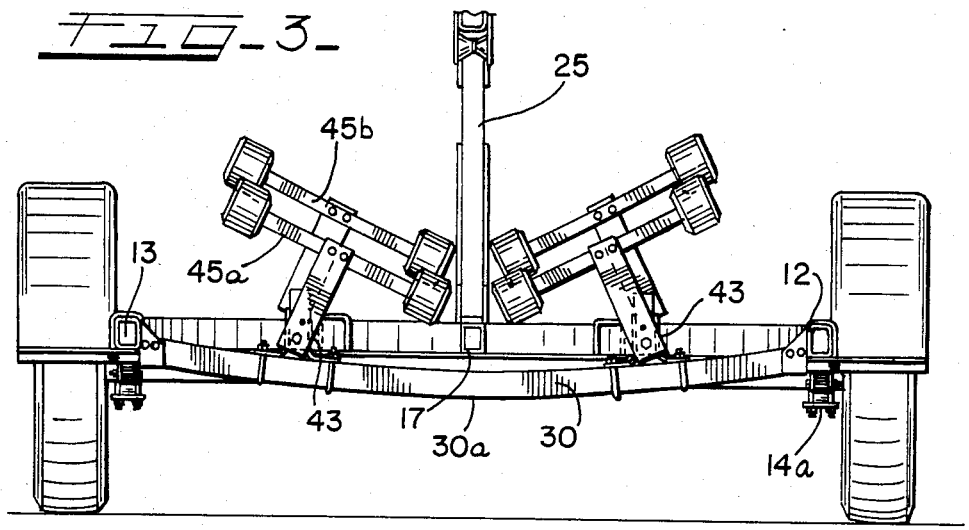
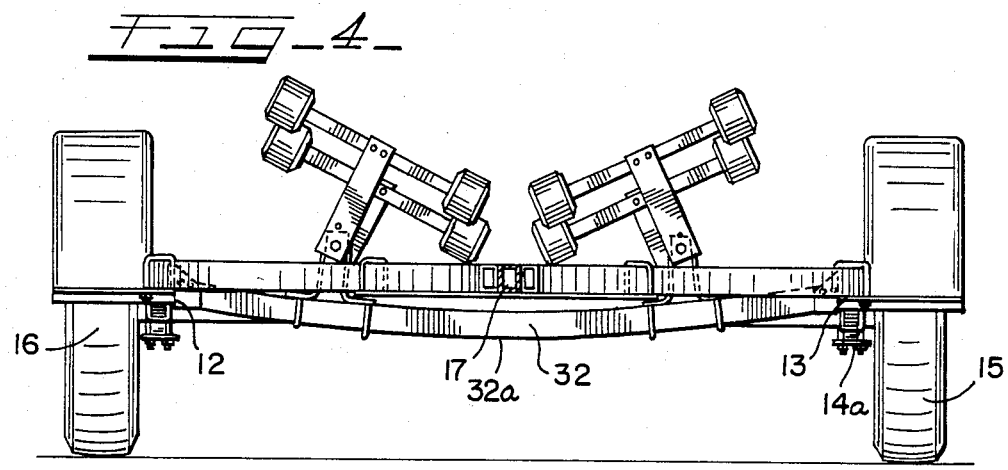
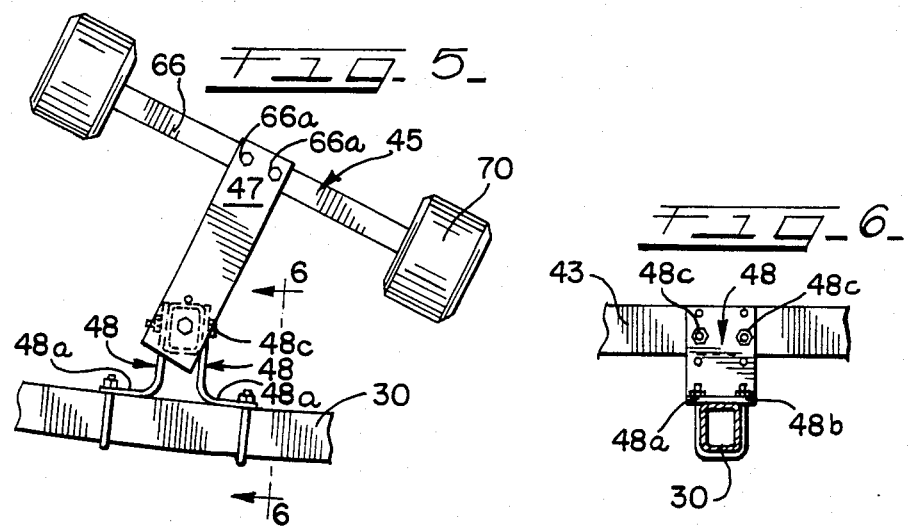

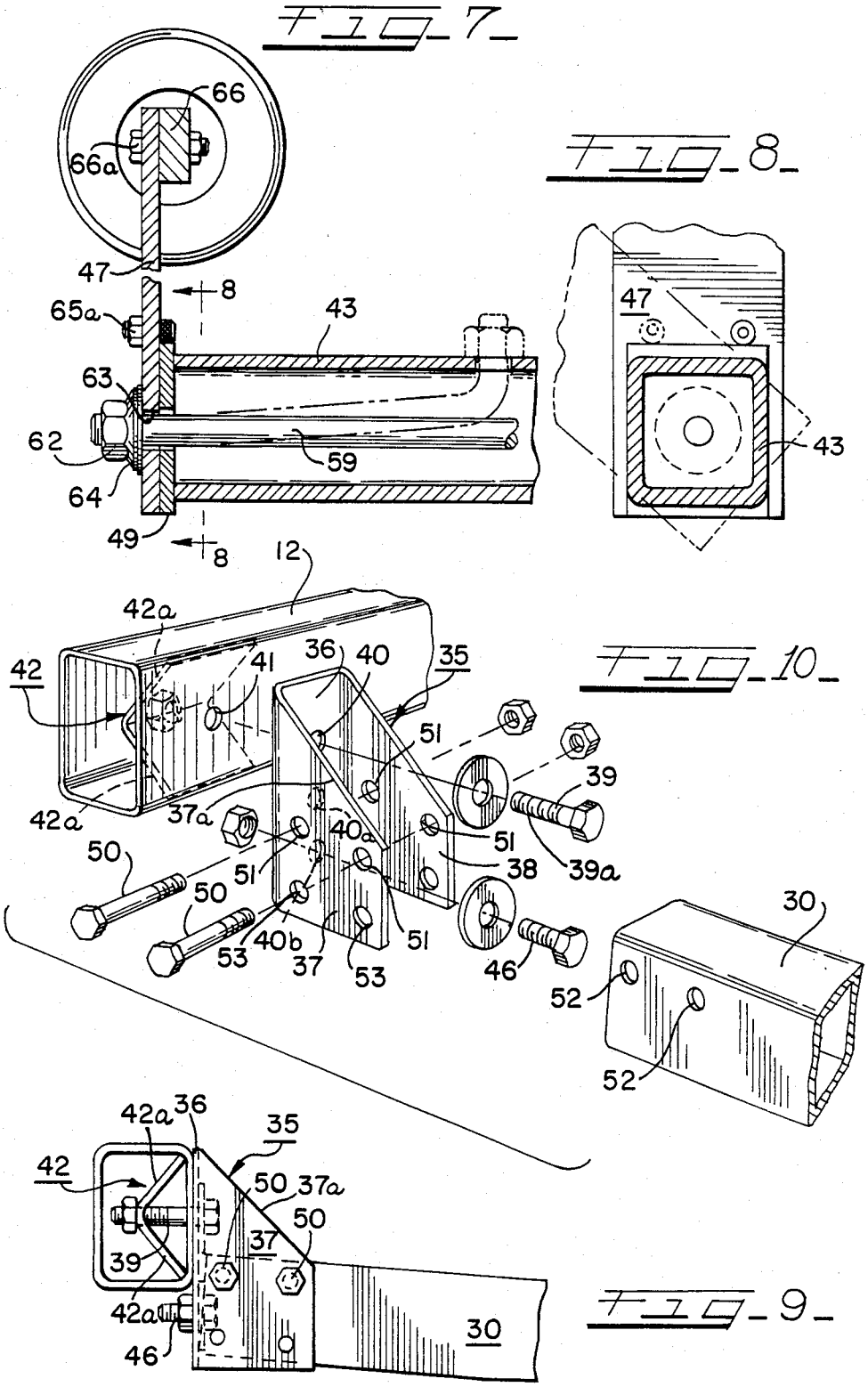

BOAT TRAILER WITH PIVOTAL DROPPED CROSS BAR ROLLER MOUNTING SYSTEM

BACKGROUND OF THE INVENTION

This invention relates, in general, to boat trailers and, in particular, to a boat trailer having an improved frame especially designed for hauling and storing a variety of boats of the type generally referred to as pleasure boats.

More specifically, but without restriction to the particular uses being described, this invention relates to a boat trailer having a pivotal crossbar roller mounting system to maintain boats having a multitude of various hull configurations with effectiveness when loaded and which, in addition, facilitates loading and unloading of the trailer.

Boat trailers have achieved increasing popularity in recent years due to the convenience and mobility they provide for transporting and storing boats of various designs on land with the capacity of being launched and loaded from the water as desired. To achieve such versatility, it is well recognized that a boat trailer must securely support the boat and that the boat supporting elements on the trailer conform to the boat hull contour so that pressures exerted thereby are distributed and localized stress, which will result in damage to the hull, is avoided. Generally, such boat supporting elements are secured to crossbar members of the trailer frame to enable the boat supporting elements to be situated at desired positions laterally of the trailer.

Boat trailers in the past have required a cross frame support structure which rigidly connects the side booms of the trailer frame. While such rigid cross frame structure has been formed in both a straight and downwardly curved configuration, these rigid cross frame structures utilized in the prior art do not provide an optimum accommodation of various curvatures of the hulls of boats and are further deficient in the manner in which they position the boat supporting elements of the trailer, preventing the boat from being carried with its center of gravity close to the ground for increased stability. Moreover, the design of such rigidly connected frame-forming cross members often is hit by the hull of certain boats and interferes with loading and unloading. In addition, the prior art technique of attaching the cross members to the longitudinal side boom of a frame has not been wholly satisfactory from an aesthetic viewpoint with, for example, unsightly bulky attachment elements and protruding members being prevalent.

SUMMARY OF THE INVENTION

It is, therefore, an object of the present invention to improve boat trailers.

It is another object of this invention to mount hull-engaging elements of the trailer on pivotal cross members having a curved or dropped configuration.

Another object of this invention is to support cross members of a boat trailer for selected pivotal movement about an axis transverse of the longitudinal axis of the trailer.

Still another object of this invention is to mount crossbar members of a trailer on an improved bracket.

These and other objects are attained in accordance with the present invention wherein there is provided a boat trailer having pivotally mounted crossbar means facilitating loading and unloading a trailer and assuring efficient support of a boat loaded thereon. The crossbar means of the invention is provided with a dropped or curved configuration which more closely conforms to the design of the hull of the boat for support on the trailer at a lowermost position and for effective loading and unloading. The pivotal mounting and curved form of the crossbar means not only maintains the keel and hull as low as possible, but naturally permits the hull contacting elements to tilt inwardly without the need for any particular tilting capability. The crossbar means of the invention is supported on the trailer booms by means of an improved bracket means having the capability of effectively supporting the boom for pivotal movement. The improved bracket means disclosed herein accommodates a variety of shaped cross members as needed for support of various designed craft hulls.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a side elevation of a boat trailer which embodies the improved pivotal dropped crossbar mounting system and mounting bracket of the invention illustrated with a trailer being shown with a shallow draft type boat being indicated in phantom lines in two positions, one at the start of loading, and the other at a full loaded position;

FIG. 2 is a plan view of the trailer structure shown in FIG. 1;

FIG. 3 is a rear elevational view, to an enlarged scale, showing the rear pivotal dropped crossbar roller mounting system and bracket of the invention, the view being taken on the line 3—3 of FIG. 2;

FIG. 4 is a front elevational view, to an enlarged scale, showing the front pivotal dropped crossbar roller mounting system and mounting bracket of the invention, the view being taken on the line 4—4 of FIG. 2;

FIG. 5 is an elevational view, to an enlarged scale, showing the hull engaging roller arrangement of the invention at the rear end of the trailer, the view taken along the line 5—5 of FIG. 2;

FIG. 6 is a sectional view, to an enlarged scale, taken along the line 6—6 of FIG. 5;

FIG. 7 is a sectional view, to an enlarged scale, taken along the line 7—7 of FIG. 2;

FIG. 8 is a sectional view, to an enlarged scale, taken along the line 8—8 of FIG. 7;

FIG. 9 is a fragmentary end view of a pivotal dropped crossbar roller mounting system of the invention coupled to a longitudinal boom, taken along the line 9—9 of FIG. 2; and FIG. 10 is an exploded perspective view, to an enlarged scale, showing the improved bracket for mounting the pivotal dropped crossbar roller mounting system of the invention.

DESCRIPTION OF THE PREFERRED EMBODIMENT OF THE INVENTION

Although not intended to be so limited, for convenience of illustration, the improved boat trailer with pivotal dropped crossbar roller mounting system of the invention is shown in connection with a trailer for loading and hauling or supporting a low or shallow draft type boat. The illustrated trailer construction enables the boat to be loaded directly from the water by backing the trailer down a ramp or incline and bringing the rearmost hull engagement roller assemblies into position close to the boat. The boat is then advanced into contact with the roller assembly and drawn forward into supporting engagement with the rearmost hull engaging roller assemblies.

The trailer is readily adapted for convenient loading of boats as shown and is so designed that the basic trailer frame structure accommodates a considerable variation in size and hull configuration. The roller support structure of the invention can also be utilized with other trailers such as, for example, trailers suitable to support a deep draft or shoal draft type boat, such as a sail boat with a deep keel, or in other trailer configurations in which the improved support and loading characteristics of the invention are desired.

In the trailer arrangements shown in FIGS. 1 to 10, the basic frame structure 10 comprises laterally spaced, elongated side frame members or booms, 12 and 13, arranged as major portions in parallel relation and having bolted thereto an axle 14 and springs 14a which are longitudinally adjustable relative to the side boom or frame members. On the opposite ends of the axle 14 are wheels 15, 16, each of which is partially covered by an associated fender. While a single axle arrangement is shown, a double axle tandem axle arrangement may be used, either of which may be moved along the side booms 12 and 13, to obtain a desired total weight distribution that is known to those skilled in the art.

The forward ends of the longitudinal side frame members 12, 13 have portions which converge toward each other to terminate on opposite sides of a tongue 17. The tongue 17 extends along the longitudinal centerline of the trailer frame, with the trailing end secured by a U-bolt 18 to a short tongue-to-boom yoke 20 which has its opposite end secured by U-bolts 22, 23 adjacent the ends of the side frame members 12 and 13. The forward end of the tongue 17 has mounted thereon a hitch coupler 24 for connection to a cooperating connecting element on a powered vehicle used for pulling the trailer. An upstanding, substantially inverted Y-shaped, winch stand 25 is carried on the tongue 17, which is adjustable fore, aft, and vertically, and supports at its upper end a manually or power operated winch 26. The winch 26 is mounted on a frame assembly 27 which extends in a direction of the rear or trailing end of the trailer. The frame assembly 27 also supports a bow-engaging roller stop assembly 28 provided for steadying the bow end of the boat when in a fully loaded position during its transport. The winch 26 includes a cable 29 with means for attaching a free end to the bow of the boat for drawing the boat onto the roller assembly supports of the invention.

The trailer side frame members or booms 12, 13 are laterally spaced by crossbar members 30 and 32, which are pivotally supported therefrom. In the form illustrated, which is arranged for supporting a shallow draft power boat thereon, the crossbar member 30 is mounted near the trailing end of the trailer, while crossbar member 32 is spaced forwardly thereof. The position and spacing of these members lengthwise on the trailer will depend upon the weight distribution of the boat to be carried. Each of the cross members 30 and 32 are illustrated having a dropped or curved lengthwise configuration resulting in a bowed appearance, as best shown in FIGS. 3 and 4, having their lowest bottom point 30a, 32a coinciding substantially with the longitudinal centerline of the trailer.

The pivotal crossbar members 30 and 32, which laterally span the side booms 12 and 13 for forming the basic trailer structure, are pivotally mounted at their opposite ends on side booms 12 and 13 in an identical manner so as to enable them to tilt or pivot within predetermined limits about axes extending transversely of the frame to facilitate loading the boat directly from or into the water. The pivotal mounting system of the cross member 30, 32, as illustrated on the trailer in FIGS. 1 and 2, is best shown in FIGS. 9 and 10, and comprises an improved connecting bracket member 35 of substantially U-shape in a horizontal cross section. Although connecting bracket 35 is described and illustrated in FIGS. 9 and 10, with respect to the left end of cross member 30 viewing FIG. 1, the identical corresponding bracket is utilized to mount the other end of cross member 30 and front cross member 32.

The bracket 35 is formed with a base section 36, a portion of which is adapted to contact the inner side surface of the side boom 12. The bracket member 35 further includes a pair of spaced parallel side sections 37 and 38 integrally coupled to the bottom section 36 and extending perpendicularly therefrom to form the U-shape of the bracket. The upper edges 37a, 37b of side sections 37 and 38 slope downwardly from the upper edge of base 36 to form substantially trapezoidal-shaped side vertical surfaces, respectively.

Bracket member 35 is attached by means of a pivot bolt 39 to side boom 12 for pivotal movement about an axis transverse to the longitudinal axis of the trailer. Pivot bolt 39 extends through an upper bolt hole 40 formed in base section 36 and a corresponding bolt hole 41 provided in the inner lateral face of a boom member 12, 13. Additional holes 40a and 40b are formed in the base section 36 to permit variation in the vertical positioning of the cross member 30 relative to the side booms 12, 13. The diameter of bolt 39 is somewhat less than the diameter of these bolt holes to permit pivotal movement or swiveling of bracket 35 relative to boom 12 in a manner to be described. The threaded end 39a of pivotal bolt 39 protrudes through a retention bracket 42 having angularly disposed legs 42a which respectively compress against the inner corners of boom member 12 upon tightening of a nut member. Retention bracket 42 creates a solid interface with bracket member 35 to assure adequate support even when the boom 12 is constructed of lighter gauge tubing. Although it is within the scope of the invention to support bracket member 35 by means of a thru-bolt extending through both lateral surfaces of boom members 12, 13, the use of retention bracket 42 as shown in FIGS. 9 and 10 is advantageous because it minimizes collapse of the side boom tube and ultimate undue and detrimental flex in the boom and tongue assembly.

The base section 36 of bracket 35 is provided with a stop bolt 46 which is positionable through a vertically aligned bolt hole 40, 40a, or 40b to limit the throw of cross member 30 by contacting the underside of boom 12, 13. For very high settings, as needed for certain deck boats, bolt 39 may support the bracket swiveling movement through bolt hole 40b and the stop bolt 46 may be retained in bolt hole 40 to act as a stop through contact with the upper surface of boom 12, 13. From the foregoing, it should be apparent that bracket 35 and cross member 30 are capable of undergoing pivotal movement about the axis created by pivot bolt 39.

The crossbar member 30, as shown in FIGS. 9 and 10, is rigidly supported on bracket 35 with its end attached between the pair of spaced side sections 37, 38. A pair of bolts 50 extend through upper bolt holes 51 of side sections 37, 38, respectively, and an aligned pair of holes 52 provided in the cross member 30. The pair of bolts 50 rigidly attach the ends of the cross member 30 to the bracket member 35 for support and pivotal movement therewith. The bracket member 35 optionally includes a pair of lower bolt openings 53 extending through side sections 37, 38 to enable the cross member to be attached at this position relative to the bracket in certain encountered conditions by which such a connection is advantageous to accommodate various boat designs and lend versatility to the system.

The crossbar members 30 and 32 carry hull engaging roller assemblies which are in the arrangement illustrated, in paired relation with the assemblies of each pair thereof in the form shown, being arranged on opposite sides of the longitudinal centerline of the trailer. Since the details of the assembly of each pair thereof are identical, the elements on one side of the assembly which correspond to the elements on the other side will be identified by the same numerals primed. Although different types of roller assemblies may be carried by the crossbar members 30 and 32 as shown, for purpose of illustration, the same type of roller configuration is employed throughout the trailer with the particular type of configuration depending upon the capacity of the trailer.

In the following description, the hull engaging roller assemblies carried by crossbar members 30 and 32 are disclosed having the capability of pivoting about axes substantially parallel to the longitudinal axis of the trailer for the advantages to be set forth. However, the invention herein disclosed is not intended to be so limited since the dropped or curved lengthwise configuration of crossbar members 30 and 32 naturally tilts hull engaging roller assemblies supported thereon in an inward direction achieving improved cradling of a boat loaded on the trailer and effective loading and unloading such as, for example, by virtue of lower positioning of the boat on the trailer and the ability to prevent interference between the hull or keel with the cross member during launching or loading.

The rearmost crossbar member 30, in the form shown, carries hull engaging roller assemblies 44 and 45' of the identical construction which are shown spaced equally on opposite sides of the longitudinal line of the trailer and mounted for novel pivotal movement about parallel axes extending longitudinally of the trailer frame (FIGS. 3 to 5). These assemblies 44, 45' comprise support members 43, 43' of relatively short length which are mounted in parallel, transversely spaced relation on the crossbar member 30 and carry at their fore and aft ends pivotally mounted, hull engaging rollers to be described.

As shown in FIGS. 2 to 7, the member 43 is in the form of a roller supporting, longitudinally extending tube, which is mounted on the cross frame member 30 by means of a pair of spaced angled brackets 48 respectively having a lower bent section 48a bearing against the top of cross frame member 30 (FIGS. 5 and 6). Lower bent sections 48a each include a pair of holes 48b positioned fore and aft of the section 48a to receive the legs of a pair of U-bolts embracing crossbar member 30 to affix the angled bracket 48 thereto. The holes 48b are punched in angled brackets 48 in close tolerances to the lateral surfaces of the cross frame bar 30 to insure minimum swing of the member 43 in its lateral position relative to crossbar member 30. Member 43 is affixed to the upper portion of bracket 48 by means of a pair of bolts 48c extending through each pair of brackets 48 and complementary bolt holes situated at a position on tube member 43 intermediate its ends.

The hull engaging roller assembly 45 includes a roller assembly 45a mounted at its forward end and a roller assembly 45b mounted at its trailing end for pivotal movement substantially about the longitudinal axis of the tube member 43. The roller assemblies 44 and 45 are mounted for pivotal movement by means of a support arm or plate 47 pivotally supported at the forward and aft ends of tube members 43 against a bearing plate 49. The plates 49 are each positioned adjacent to the open forward and aft ends of tube members 43, and a long bolt 59 extends through each plate 49 and outward through a corresponding bolt hole 63 in support arm 47 (FIGS. 7 and 8). While the bolt 59 is preferred as being a rod threaded at both ends, one of the ends bearing against tube 43 could be a standard bolt head or any other structure for pinning one end. In addition, as shown in phantom, the bolt 59 could be two separate bolts each including a head bearing on tube 43 and extending downward passing through holes provided in the upper surface of tube member 43 and curving outward to extend along the axis of tube 43. A nut 62 retains the support arm and plate to tube 43 as best shown in FIGS. 7 and 8. Thus, the bolt 59 is retained to tube 43 and provides a shaft about which the support arm 47 can rotate. To better permit rotation of the support arms, a conventional washer 64 may be positioned between the nut of the angle bolt and the outer surface of the support arms. As best shown in FIG. 7, a stop 65a in the form of a shaft extending through a hole in the support arm 47, is formed on the side of each support arm 47 to limit the outboard pivotal movement of the roller assemblies away from each other to facilitate drawing a boat on the trailer.

A crossbar member 66 is coupled to the upper end of each of the support arms 46 by any suitable technique such as by a pair of bolts 66a. Crossbar members 56 carry, by suitable journals at their opposite ends, hull engaging rollers 70 which are mounted for free rotation thereon and facilitate continuous engagement of the boat hull at all contact points to evenly distribute the weight during launching, loading, or transport through a multi-planar and/or compound pivotal action. From the foregoing, it should be apparent that the pivotally secured support arm 47 produces an arcuate motion of crossbar member 66 with rollers 70 about an axis formed along tube member 43. Such a mounting supports the roller assembly at a greater spaced distance from the longitudinal centerline of the trailer permitting rollers 70 to contact a hull during transport and storing at an optimum lower position so as to provide greater lateral stability of the boat on the trailer. This increase in lateral stability by the support assembly is achieved with the capability of the support rollers being able to "close the gap" or maintain contact with the configuration of the hull as it moves past rollers 70 during loading or launching. By closing the gap, rollers 70 are able to prevent the bow or keel of a boat from contacting the crossbar member of the trailer frame because the lower pivot point mounting of arm 47 swings the rollers farther inward towards the center during launching. Thus, by shifting the pivot point of the roller assembly farther outward and lower on the frame on the dropped cross member, better transport, loading, and launching characteristics are achieved.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A boat trailer comprising
   at least two longitudinally extending side frame members carried on a wheel bearing axle,
   said side frame members each having a forward converging portion forming a vehicle-engageable tongue for operative connection to a towing vehicle and a rear boat-supporting portion extending parallel to each other,
   said parallel boat-supporting portion of said side frame members defining an open area therebetween throughout the length thereof without any fixed structural cross frame members interconnecting said parallel boat-supporting portions of said side frame members,
   at least one cross support member extending transversely between said longitudinally extending side frame members to effect the parallel spacing thereof and pivotally connected to said boat-supporting portion of each of said longitudinally extending side frame members by bracket means for pivotal movement relative thereto,
   boat hull engaging support members carried by said cross support member for pivotal movement therewith, and
   said cross support member having a downward curve along its length relative to said pivotal connections.

2. The boat trailer of claim 1 wherein said cross support member has a lowermost portion at a position substantially corresponding to the longitudinal centerline of the trailer.

3. The boat trailer of claim 1 wherein a substantial portion of the cross support member is disposed beneath a horizontal plane passing through said longitudinally extending side frame members.

4. The boat trailer of claim 1 wherein said bracket means includes mounting means pivotally supporting said bracket means to effect pivotal movement of said cross support member relative to said longitudinally extending side frame members about an axis extending transversely thereto.

5. The boat trailer of claim 4 wherein said bracket means is formed with a substantially U-shaped cross sectional configuration having a base section and a pair of parallel side sections.

6. The boat trailer of claim 5 wherein said bracket means includes attachment means coupling a respective end of said cross support member between said parallel side sections.

7. The boat trailer of claim 4 wherein said bracket means includes a pair of bracket members each coupling one end of said cross support member to one of said longitudinally extending side frame members.

8. The boat trailer of claim 4 wherein said mounting means includes a pivot shaft coupled to a longitudinally extending side frame member for effecting pivotal movement of the bracket means relative thereto.

9. The apparatus of claim 1 including at least two cross support members extending transversely between said longitudinally extending side frame members to effect the parallel spacing thereof and pivotally connected to said boat-supporting portion of each of said longitudinally extending side frame members for pivotal movement relative thereto, and
   at least one of said cross support members being positioned parallel to and on each side of said wheel bearing axle for defining an open area between said pivotal cross support members throughout the length of said side frame members extending therebetween.

10. A boat trailer comprising
    at least two longitudinally extending side frame members carried on a wheel bearing axle,
    said side frame members each having a forward converging portion forming a vehicle-engageable tongue for operative connection to a towing vehicle and a rear boat-supporting portion extending parallel to each other,
    a first boat hull support means carried on said rear boat-supporting portion of said side frame members for supporting a boat thereon,
    at least one downwardly curved cross support member extending transversely between said parallel boat-supporting portions of said longitudinally extending side frame members to effect the parallel spacing thereof and supported from each of said longitudinally extending side frame members for pivotal movement by bracket means coupled thereto,
    a second boat hull support means carried by said cross support member for supporting a boat thereon, and
    said side frame members between said first boat hull support means and said pivotal cross support member pivotally supported therefrom defining an open area throughout the length thereof which is free of any fixed structural members interconnecting said side frame members.

11. The apparatus of claim 10 wherein said second boat hull support means includes a support arm and boat hull engaging means carried thereon,
    said support arm being pivotally connected to said cross support member to permit movement of the support arm in a plane substantially normal to the longitudinal axis of the trailer, and
    said support arm pivotal connection being spaced from said boat hull engaging means to provide movement of said support arm toward and away from said longitudinal axis of the trailer.

12. A boat trailer according to claim 11 wherein said boat hull engaging means includes a roller support means mounting a plurality of rollers for rotatable movement about a rotational axis substantially normal to the pivotal axis of the support arm.

13. A boat trailer according to claim 12 wherein said roller support means further supports said plurality of rollers for additional pivotal movement about another axis normal to said rotational axis.

14. A boat trailer according to claim 11 wherein said boat hull support means further includes pivotal movement limiting means restraining a lower end portion of said support arm to limit the pivotal movement thereof about the pivotal axis of said support arm.

15. A boat trailer according to claim 11 wherein said boat hull engaging means is rigidly attached to said support arm.

16. A boat trailer according to claim 15 wherein said boat hull engaging means includes a plurality of rollers.

* * * * *